United States Patent
Boianjiu

Patent Number: 5,688,083
Date of Patent: Nov. 18, 1997

[54] DRILLING TOOL AND AN INDEXING CUTTING INSERT FOR USE THEREIN

[75] Inventor: Gideon Boianjiu, Kfar Havradim, Israel

[73] Assignee: Iscar Ltd., Migdal Tefen, Israel

[21] Appl. No.: 373,326

[22] PCT Filed: May 19, 1994

[86] PCT No.: PCT/EP94/01626

§ 371 Date: Mar. 16, 1995

§ 102(e) Date: Mar. 16, 1995

[87] PCT Pub. No.: WO94/27772

PCT Pub. Date: Dec. 8, 1994

[30] Foreign Application Priority Data

May 20, 1993 [IL] Israel ......................... 105758

[51] Int. Cl.⁶ ..................................... B23B 51/00
[52] U.S. Cl. .................. 408/224; 408/713; 407/113
[58] Field of Search ............................ 408/223, 224, 408/230, 233, 713; 407/113, 114

[56] References Cited

U.S. PATENT DOCUMENTS

| | | |
|---|---|---|
| 3,094,016 | 6/1963 | Kleine . |
| 4,100,983 | 7/1978 | Herrmann et al. . |
| 4,194,862 | 3/1980 | Zweekly ...................... 408/224 |
| 4,572,042 | 2/1986 | Wiman ...................... 407/114 X |
| 4,867,616 | 9/1989 | Jakubowicz ............... 407/113 X |
| 5,049,011 | 9/1991 | Bohnet et al. ................. 408/223 |
| 5,071,292 | 12/1991 | Satran . |
| 5,158,402 | 10/1992 | Satran et al. ................. 407/113 |
| 5,203,649 | 4/1993 | Katbi et al. ................... 407/114 |
| 5,221,164 | 6/1993 | Allaire ....................... 407/114 X |
| 5,302,059 | 4/1994 | Fabiano ........................ 408/223 |

FOREIGN PATENT DOCUMENTS

| | | |
|---|---|---|
| 0 089 545 | 9/1983 | European Pat. Off. . |
| 0 133 168 | 2/1985 | European Pat. Off. . |
| 373 292 | 6/1990 | European Pat. Off. . |
| 892182 | 3/1944 | France . |
| 2926 462 | 1/1981 | Germany . |
| 33 32821 A1 | 5/1984 | Germany . |
| 55-37209 | 3/1980 | Japan . |
| 56-76313 | 6/1981 | Japan . |
| 57-48411 | 3/1982 | Japan . |
| 59-196107 | 11/1984 | Japan . |
| 142 514 | 7/1980 | Netherlands . |
| 2030487 | 4/1980 | United Kingdom . |
| WO91/18700 | 12/1991 | WIPO . |

*Primary Examiner*—M. Rachuba
*Assistant Examiner*—Henry W.H. Tsai
*Attorney, Agent, or Firm*—Pennie & Edmonds

[57] ABSTRACT

A drilling tool having an elongated body with a longitudinal axis and provided with at least one insert receiving pocket and an indexable cutting insert for use with the drilling tool for performing drilling action is disclosed. The insert of the drilling tool includes a rake face, relief flank faces, a base, a plurality of cutting edges, each defined between the rake face and adjacent relief flank face and included between two adjacent cutting corners. Each cutting edge has at least one set of component cutting edges, each set having two pairs of component cutting edges merging in a common point, each pair comprising a first and a second component cutting edge merging via a bridging section directed towards a central line constituting or parallel to a median line of the insert and passing through the common point. The component cutting edges are oriented with respect to the central line so that an outermost extremity of the second component cutting edge is closer to a center of the insert and to the central line than the outermost extremity of the first component cutting edge. This ensures that during the drilling action, a line parallel to the longitudinal axis and passing through the outermost extremity of the first component cutting edge intersects the second component cutting edge and the extremities overlap.

45 Claims, 13 Drawing Sheets

DRILLING TOOL AND AN INDEXING CUTTING INSERT FOR USE THEREIN

FIELD OF THE INVENTION

The present invention relates to a metal cutting tool having one or more indexable cutting inserts and particularly designed for use in drilling, boring, sinking, hole formation or enlarging and similar rotary cutting operations. Such a tool is hereinafter generically referred to as a drilling tool.

BACKGROUND OF THE INVENTION

It is well known, in particular in drilling holes having a large depth-to-diameter ratio, that the drilling efficiency in terms of output, chip flow and tool life is significantly influenced by the efficiency of chip evacuation. In order to ensure efficient drilling and to have the chips readily removed from a cutting zone a width-to-thickness ratio of the chip produced by a cutting edge of a drill should be kept within a certain optimum range, and to this end it has been proposed to split the chip into relatively narrow strips.

Among such prior proposals is that disclosed in GB 20311487. Here there are disclosed square inserts having cutting edges in which are respectively formed pairs of chip splitting notches. Each notch has radially innermost and outermost edges such that, when the insert is mounted in the drill in a position slightly slanted with respect to an axis of the drill, the radially innermost edge of the outermost notch of the indexed cutting edge extends substantially parallel to the axis of the drill. The disclosure asserts that in this way chip splitting is ensured. However, even if such chip splitting is achieved it is very energy consuming seeing that the workpiece is in continuous contact with the notch. Besides, the construction of the cutting edge cannot provide for chip splitting over the entire length of the cutting edge as only one of the notches can be so positioned as to meet the requirements of the disclosure.

JP-59-196107 proposes a chip splitting solution similar to the one described above. Here a cutting edge of an insert is formed with chip splitting steps slightly projecting in a cutting direction. As these steps are also in a continuous contact with a machined workpiece, the chip separation provided by this drill is extremely energy consuming. Furthermore, in view of the fact that it is designed for drilling deep holes, the drill is provided with guide pads, making the whole construction more complicated and expensive.

With drilling holes of large depth-to-diameter ratios, it is not practical to provide indexable-insert drills with such guide pads, and as such drills are not guided by the holes it is important to ensure that the cutting forces acting on the drill, especially radial components of such cutting forces, are substantially balanced and in this way to minimize size loads leading to tool deflection and consequent inaccuracies in hole size.

SUMMARY OF THE INVENTION

In the further description and claims the term "center of the insert" means a center of a circle inscribed in the insert and the term "median line" means a line drawn from the center of the insert to the center of a line connecting two outermost cutting edge extremities.

It is the object of the present invention to provide an improved metal drilling tool and an indexable insert for use therein, in which the above referred-to disadvantages are substantially reduced and with which a more effective chip splitting is ensured along the cutting edge.

According to the present invention, there is provided a metal drilling tool having an elongated body with a longitudinal axis and provided with at least one pocket at its working end, at least one indexable cutting insert mounted in the or each pocket for performing drilling action the said insert comprising: a rake face, relief flank face a base, a plurality of cutting edges, each defined between the rake face and adjacent relief flank face and included between two adjacent cutting corners, at least one of said cutting edges comprising at least one set of component cutting edges, each set consisting of two pairs of component cutting edges, each pair consisting of a first and a second component cutting edge, the first component cutting edges of both pairs merging in a common point said component cutting edges being oriented so that an extremity of the second component cutting edge innermost with respect to said common point is closer to a center of the insert than an extremity of the first component cutting edge outermost with respect to said common point, said extremities merging via a bridging section which is directed from said outermost extremity of the first component cutting edge towards a central line constituting or parallel to a median line of the insert so that said innermost extremity of said second component cutting edge is closer to said first central line than said outermost extremity of said first component cutting edge ensuring that during the drilling action line parallel to said longitudinal axis and passing through said outermost extremity of the first component cutting edge intersects said second component cutting edge and said extremities overlap.

In accordance with the present invention there is also provided an indexable drilling insert for use in such a drilling tool and comprising a rake face, relief flanks faces, a base, a plurality of cutting edges, each defined between the rake face and adjacent relief flank face and included between two adjacent cutting corners at least one of said cutting edges comprising at least one set of component cutting edges, each set consisting of two pairs of component cutting edges, each pair consisting of a first and a second component cutting edge, the first component cutting edges of both pairs merging in a common point, said component cutting edges being oriented so that an extremity of the second component cutting edge innermost with respect to said common point is closer to a center of the insert than an extremity of the first component cutting edge outermost with respect to said common point, said extremities merging via a bridging section which is directed from said outermost extremity of the first component cutting edge towards a central line constituting or parallel to a median line of the insert so that said innermost extremity of said second component cutting edge is closer to said central line than said outermost extremity of said first component cutting edge ensuring overlapping of said extremities during a drilling action.

By virtue of provision of a plurality of component cutting edges respectively coupled together by bridging sections and all mutually disposed in accordance with the invention, there can be achieved effective chip splitting for all suitable positions of the insert in the drill.

According to the preferred embodiment of the present invention, the cutting edge of the insert is formed with one set of pairs of component culling edges. If the cutting edge is long, it may be formed with two or more sets of component cutting edges.

It is advantageous if the cutting edge is provided with a chamfer at each side of the cutting corner, the chamfer merging with the second component cutting edge.

Preferably, both component cutting edges are oblique with respect to the median line of the insert, either in the same or in different directions. Preferably, the first component cutting edge is slanted with respect to the median line at an acute angle and the second component cutting edge defines with the median line an angle which is not less than 90°.

According to the preferred embodiment of the present invention the insert is provided with intermediate cutting corners located between the adjacent cutting corners of said insert so that the first component cutting edges of both pairs of component cutting edges form sides of the intermediate cutting corner.

Preferably, the pairs of component cutting edges are symmetrical with respect to said median line. However, an asymmetrical arrangement of these portions may also be advantageous.

Preferably, two or more inserts of the similar type are used in the drill. It is advantageous if at least one of said inserts is in such position that its median line is slanted with respect to said longitudinal axis.

By virtue of the division of the insert cutting edge into the component cutting edges, according to the present invention, and optimization of geometrical parameters of these component culling edges, such as their angles with the median line, lengths and orientation with respect to the longitudinal axis of the drill cutting forces acting on the component cutting edges during the drilling operation, in particular the radial components of the cutting forces, may be ensured to counteract and an improved force balance may be achieved in the drill. Due to the fact that the component cutting edges have different directions of obliqueness with respect to the median line of the insert the insert itself may be provided with the improved balance of radial components of the cutting forces.

As mentioned above, these advantages are of extreme importance for indexable-insert drills, in particular those used for drilling holes with large depth-to-diameter ratios, e.g. from three to six. Thus normally the problem of the negative influence of the radial cutting-force components on the surface finish and accuracy would require subsequent machining operations so as to achieve fight tolerances or higher geometrical accuracy of the hole, which would make the whole machining process more complicated, prolonged and expensive. Provision of the cutting edge of the indexable insert with the geometry specified in accordance with the present invention allows for efficient drilling of holes with large length-to-diameter ratios, especially when an increased feed is needed, so as to ensure heavy machining rates associated with force/power optimization.

The rake face of the insert is preferably provided with a chip forming means in the form of a groove of variable dimension. It is advantageous if a depth and a width of the groove formed along a cutting edge component which is outermost with respect to said longitudinal axis of the drill are larger than a depth and a width of the groove formed along the rest part of the cutting edge. The groove formed along said rest part of the cutting edge may consist of two grooves.

According to the preferred embodiment of the present invention, the relief flank face included between two adjacent cutting corners of the insert comprises a clearance component and a support component, the components sloping to the base at different angles.

BRIEF DESCRIPTION OF THE DRAWINGS

For a better understanding, the invention and its further preferred features will now be described, by way of example only, with reference to the following drawings in which.

DESCRIPTION OF PREFERRED EMBODIMENTS

Figure 1:
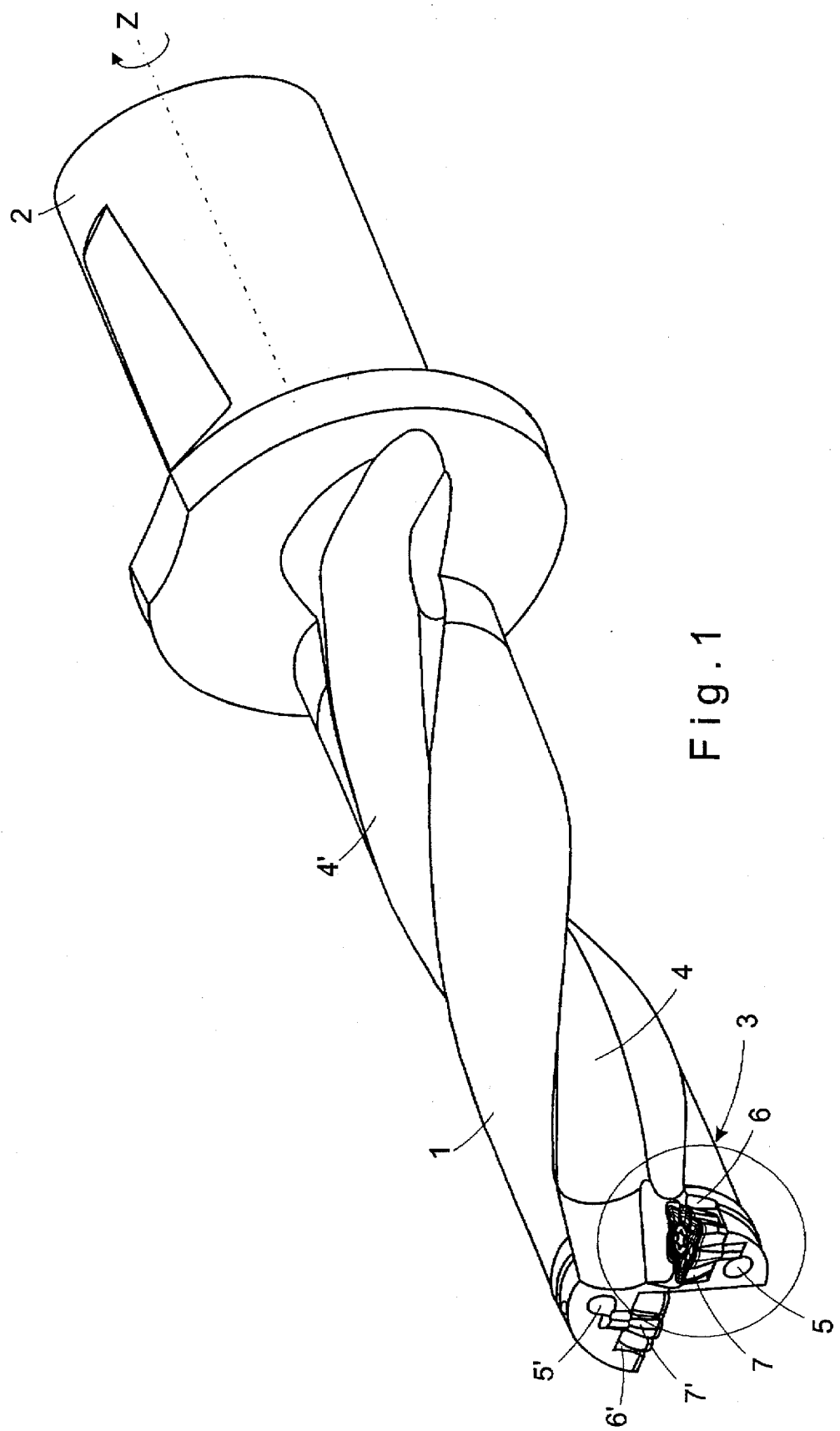
FIG. 1 is a perspective view of a drilling tool in accordance with the present invention.
Figure 2:
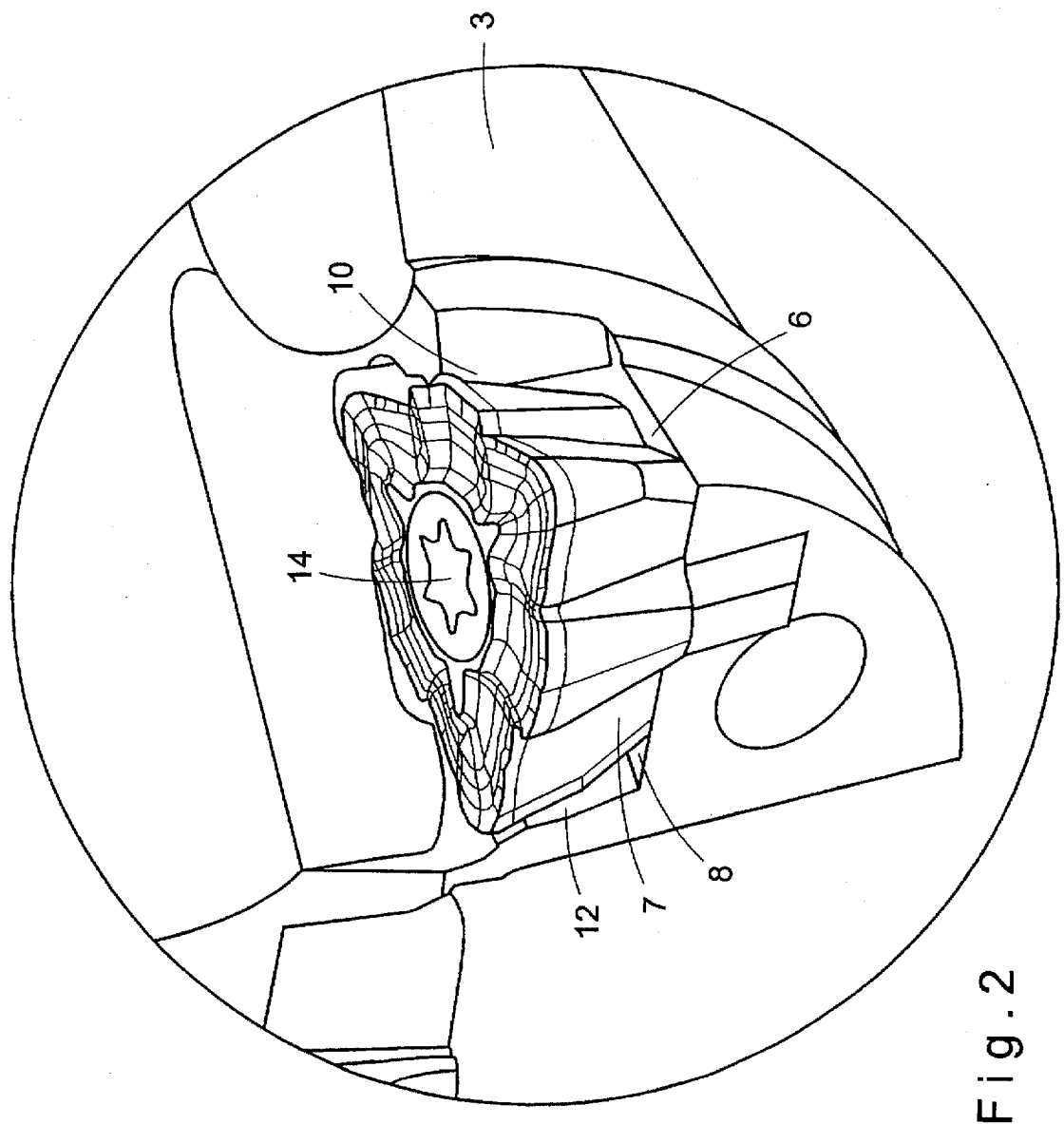
FIG. 2 is an enlarged view of the encircled detail shown in FIG. 1.
Figure 3:
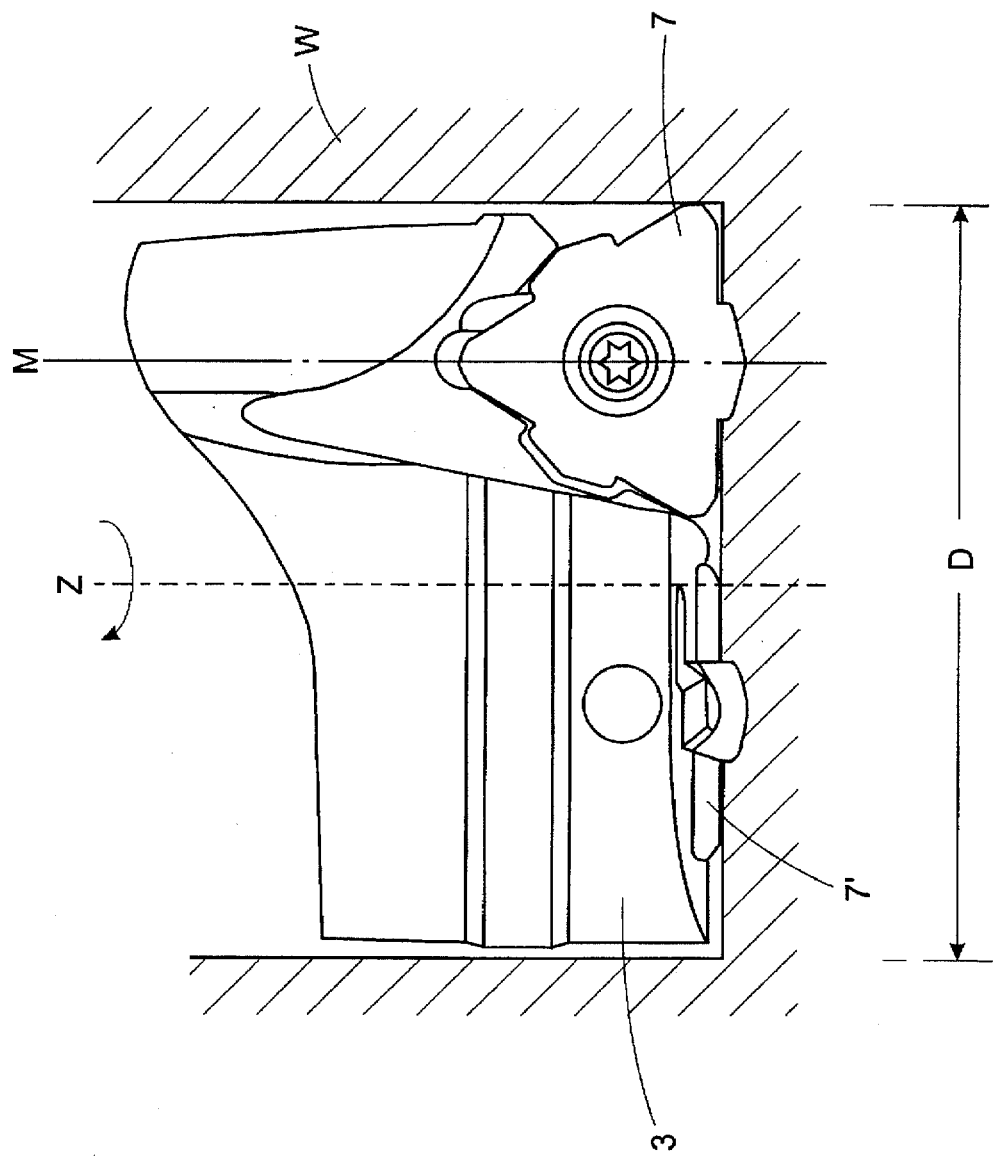
FIG. 3 is a front view illustrating disposition of the drill, shown inside a workpiece during a drilling operation.

FIGS. 1, 2 and 3 show a drilling tool in accordance with the present invention, which is to be used in drilling a hole in a workpiece W of a diameter D and having a large depth-to-diameter ratio, e.g. from 3 to 6. As seen, the drill, having a longitudinal axis Z, comprises a body 1 provided with a shank 2 to be held by an adaptor attached to a machine spindle (both not shown). In a portion of the drill body adjacent to a working end 3 there are formed flutes 4 and 4'. The body of the drill may also be provided with through-going passages 5 and 5' for a cooling medium.

At the working end 3 of the body recessed pockets 6 and 6' are provided for replaceably mounting, therein respective indexable cutting inserts 7 and 7'. As seen in FIGS. 1 and 2, each pocket 6, 6' has an appropriate base face 8 and side surfaces 10 and 12 for supporting the insert which is secured in position by a screw 14. It is common with drills of this type that the inserts are arranged in the drill so that a radially, innermost insert 7' (FIG. 3') is situated adjacent a central region of the drill body and a radially outermost insert 7 is spaced from the drill axis Z so that the distance between the outermost extremity of the cutting edge and the axis Z defines the diameter D of the hole drilled in the workpiece W. Such an arrangement enables one insert to cut a central portion of the hole and the other—the peripheral portion.

Figure 4:
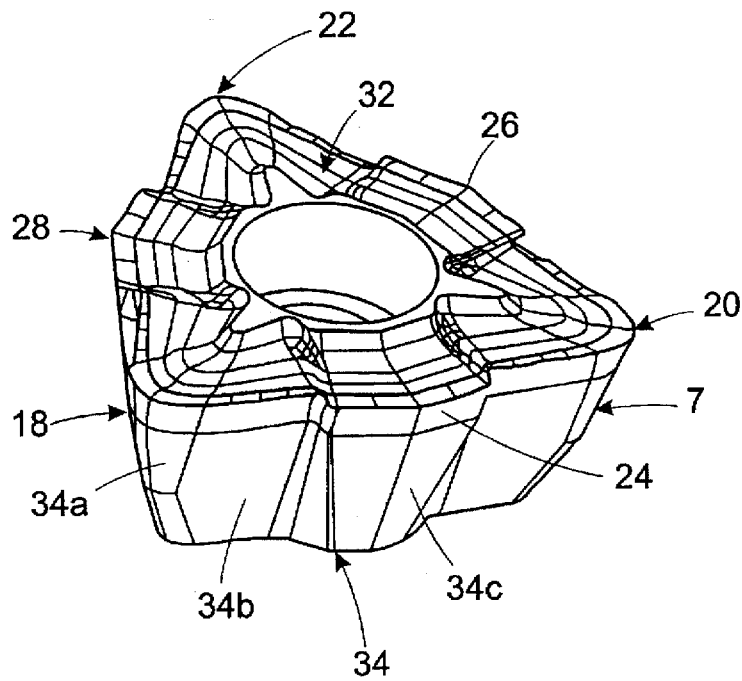
FIG. 4 is a general perspective view of an indexable insert forming part of the tool.
Figure 5A:
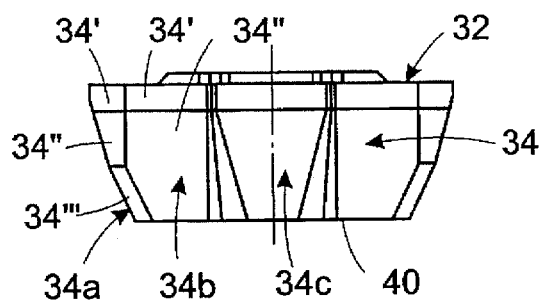
FIGS. 5a and 5b are respective side and top plan views of the insert shown in FIG. 4.
Figure 5B:
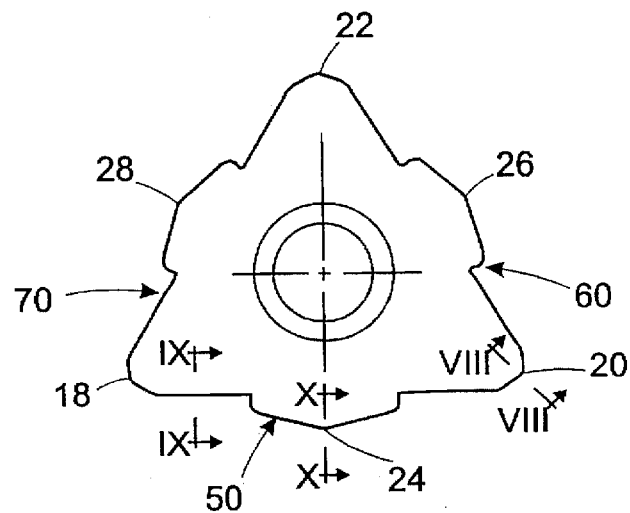

In the preferred embodiment both inserts have similar construction and therefore only one insert 7 will be further described with reference to FIGS. 4, 5a and 5b, where it is seen to be of the trigon type with a hexagonal geometry, i.e. with three main cutting corners 18, 20 and 22 and three intermediate corners 24, 26 and 28.

The insert 7 is provided with a rake face 32, relief flanks 34, 36, 38 (two of them are not seen) and a base 40. The insert 7 is so mounted that the rake face 32 of the insert preferably defines an axial angle (not shown) with an axis parallel to the axis Z. The rake surface 32 of the insert is formed with an appropriate chip forming means which will be further explained in more detail.

The relief flank 34 has a design similar to the relief flanks 36 and 38 and consists of relief flank portions 34a, 34b, 34c, where the portion 34a is associated with each main cutting corner, the portion 34c is associated with each intermediate cutting corner and the portion 34b is included between adjacent main and intermediate cutting corners. The relief flank portions 34a, 34b and 34c comprise two successive relief flank components 34' and 34" shown in FIG. 7 and also seen in FIGS. 8–10, which slope with respect to the base 40 at different angles α1 and α2. The upper relief flank component 34' serves as a clearance component and the lower relief flank component 34" is used for the insert support, when the insert is mounted in the tool. Besides. the relief flank portion 34a is provided with an additional relief flank component 34''' sloping with respect to the base at the angle α3 (shown in FIG. 8). By virtue of sloping angles α1, α2 and α3, appropriate clearance between the insert and an inner side wall of the drilled hole is provided.

Figure 6:
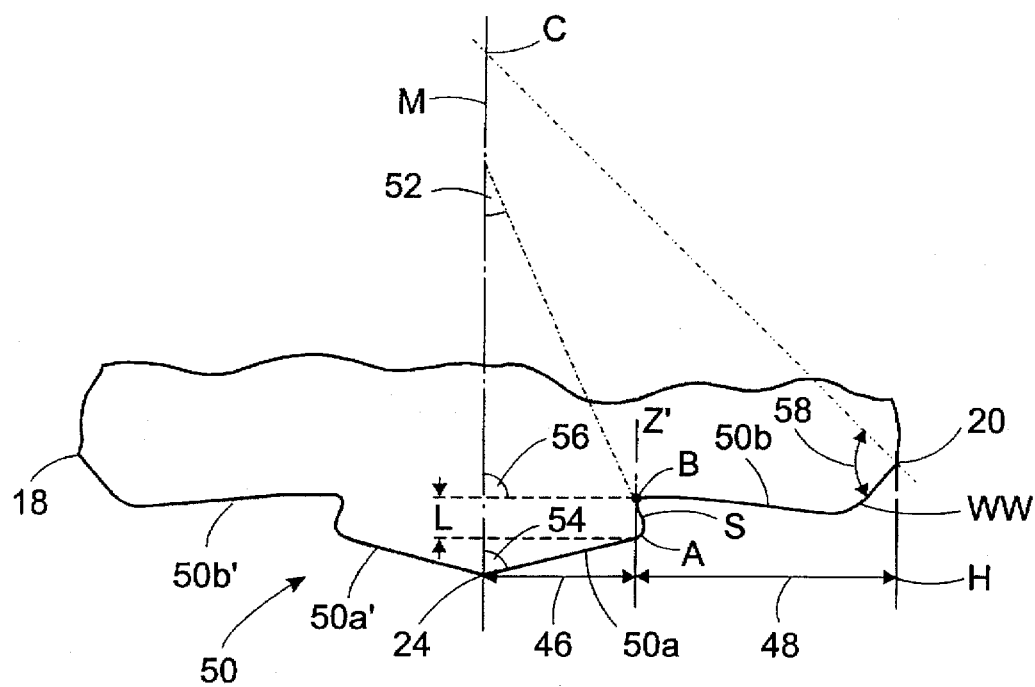
FIG. 6 is an enlarged schematic top plan view of a preferred cutting-edge configuration of the insert.

An intersection of the relief flanks with the rake face defines cutting edges 50, 60 and 70 each included between a respective pair of adjacent main cutting corners. Each cutting edge consists of two similar pairs of component cutting edges. With reference to FIG. 6, the construction of only one pair of component cutting edges of only one cutting edge will be explained, but it should be understood that the other component cutting edges have, preferably, a similar geometry.

Thus, the cutting edge 50 shown in FIG. 6 is included between the two adjacent main cutting corners 18 and 20 and consists of two pairs 50a–50b and 50a'–50b' of component cutting edges so that the component cutting edges 50a and 50a merge in a common point constituted by the intermediate cutting corner 24.

The component cutting edge 50a has an extreme point A which is its outermost extremity with respect to the intermediate cutting corner 24 and the component cutting edge 50b has an extreme point B which is its innermost point with respect to the intermediate corner 24. The component cutting edges 50a and 50b are so disposed that the point B of the component cutting edge 50b is closer to a center C of the insert than the point A of the component cutting edge 50a and the two points merge smoothly via a bridging section S. The section S is so inclined with respect to a median line M that the point B is closer to the median line than the point A and a line Z' parallel to the axis Z and passing through the point A of the first component cutting edge that the line Z' intersects the second component cutting edge 50b ensuring, an overlapping of extremities of the two component cutting edges adjacent to their extreme points A and B during the drilling operation. Therefore, an angle 52 between the bridging section S and the median line M should be chosen of such a value as to prevent the bridging section S from being parallel to the line Z' and the workpiece W from contacting the extremity of the component cutting edge 50b adjacent to its innermost point B, thereby enabling an effective chip splitting during the drilling action. It is also important for the angle 52 to be small enough so as not to weaken the cutting edge adjacent the point A of the component cutting edge 50a. In practice, this angle is in the range from 15° to 35°. A length of the bridging section defined by its projection L on the line M should be chosen so to ensure the effective chip splitting. In practice, this value should be not less than a maximal feed, e.g., 0.5:2 times the maximum feed, along axis Z as measured in ram/rev. The preferred length of the projection L is from 0.2 to 0.6 mm.

The orientation of the component cutting edges 50a and 50b is defined by respective angles 54 and 56 formed by these component cutting edges (in case the of component cutting edge 50b —by its continuation) with the line M. In the preferred embodiment the component cutting edges 50a and 50b are slanted with respect to the line M so that the angle 54 is acute and angle 56 is not less than 90°, the angles being measured on the side of the center C of the insert. In the described preferred embodiment the angle 54 is half a penetration angle defined by the intermediate cutting corner 24. In practice, the required value of the penetration angle which depends mostly on a drilled material, is in the range of 120°:160°. Thus, the angle 54 is in the range of 60°:80°. The value of angle 56 is dictated by a compromise between the requirements to the component cutting edge 50b to be inclined, on the one hand, to provide a force balance and, on the other hand, not to weaken the adjacent cutting corner 20. The angle 56 is, preferably, in the range of 90°:120°. It will be further explained that the specific disposition of the component cutting edges 50a and 50b in accordance with this preferred embodiment ensures the component culling edges to be subject to different cutting forces, in particular to radial components of the culling forces, generated during the drilling action.

The projections 46, 48 of the component culling edges 50a and 50b on a line H normal to the axis Z actually define the width of a chip produced by the corresponding component cutting edge during the drilling action. The relative lengths of these projections are to be chosen so as to ensure, on the one hand, optimum width of the split chips and on the other hand, a minimum unbalanced forces acting on the tool. Thus, in the preferred embodiment the projection 48 of the component cutting edge 50b is larger than the projection 46 of the component cutting edge 50a. In practice, the ratio between the projections 46 and 48 is about 1:1.5. In the preferred embodiment both component cutting edges are straight. It should be mentioned, however, that one component cutting edge or both of them may be curved and/or have a wavy configuration.

The cutting edge 50 is preferably provided with chamfers situated at both sides of the main cutting corner 20. A chamfer WW facing the face of the drilled hole merges the second component cutting edge 50b and takes part in cutting process, while the chamfer facing the inner side wall of the hole acts as a wiper. The provision of such chamfers allows, on the one hand, to advantageously increase an angle 58 adjacent to the end of the component cutting edge 50b and therefore to strengthen the main cutting corner 20 and, on the other hand, to improve the insert stability with respect to side wall of the hole which in the combination with the above-described configuration of the cutting edge enables efficient drilling and results in improved accuracy and surface finish of the drilled hole. In the preferred embodiment the value of the angle 58 lies in the range 38°:70°.

Figure 7:
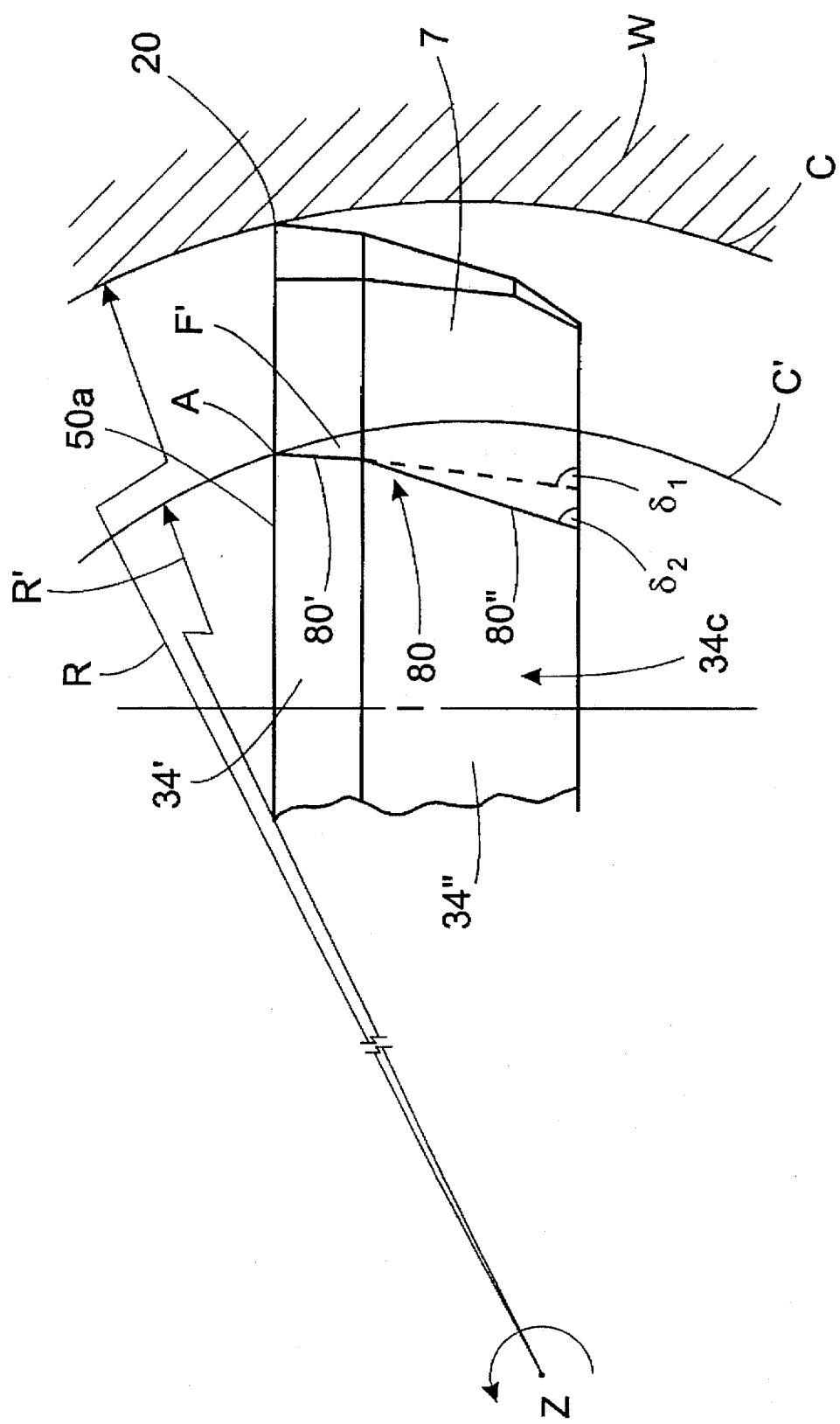
FIG. 7 is an enlarged schematic end view of the insert during a drilling operation when turned by 180°.

It is seen in FIG. 7 that when the insert 7 rotates about the axis Z the point A of component cutting edge 50a describes a circular path C' of radius R' concentric to a circular path C of radius R described by the corner 20. It is seen that in this case the point A of the cutting edge works under conditions of internal cutting, and therefore the appropriate clearance F' should be provided between the respective portion 34' of the relief flank component 34c of the insert and the workpiece W. In order to achieve this clearance F' the relief flank 34c associated with the intermediate cutting corner 24 is provided by a step 80 formed along the direction of thickness of the insert which is defined by lines 80' and 80", sloping with respect to insert base 40 at angles δ1 and δ2. where δ1>δ2.

Figure 10:
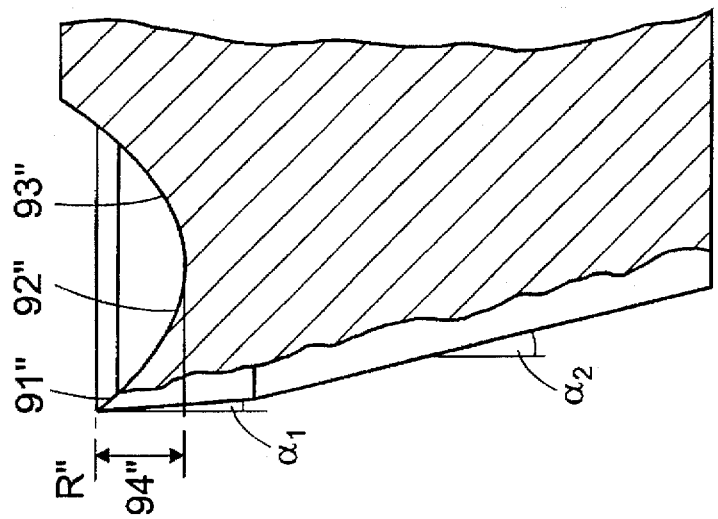
FIGS. 8, 9 and 10 are enlarged cross-sectional view's of the insert taken respectively along lines VIII—VIII, IX—IX and X—X of the view shown in FIG. 5.
Figure 9:
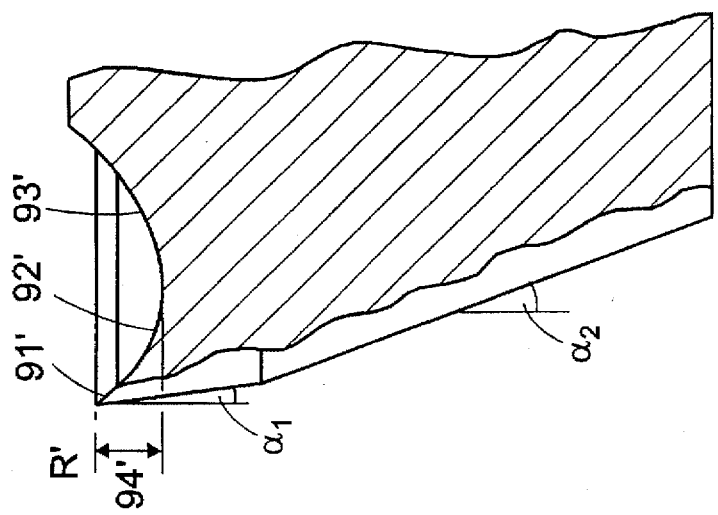
Figure 8:
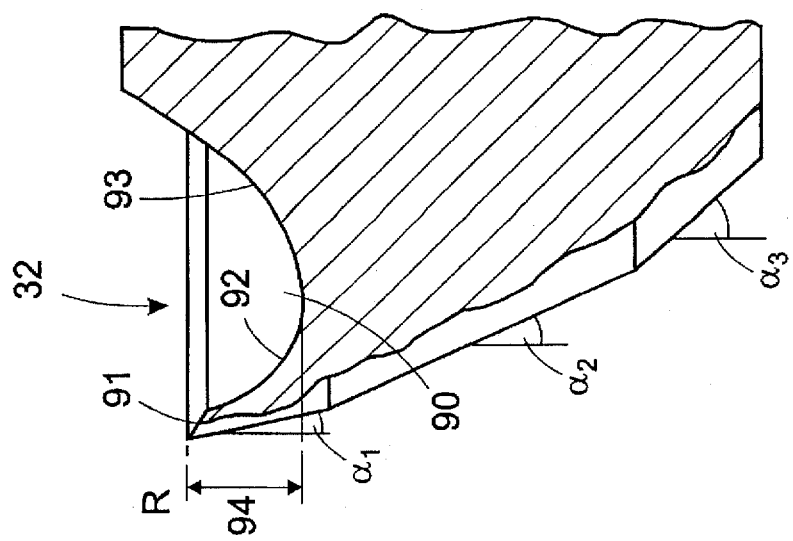
Figure 11:
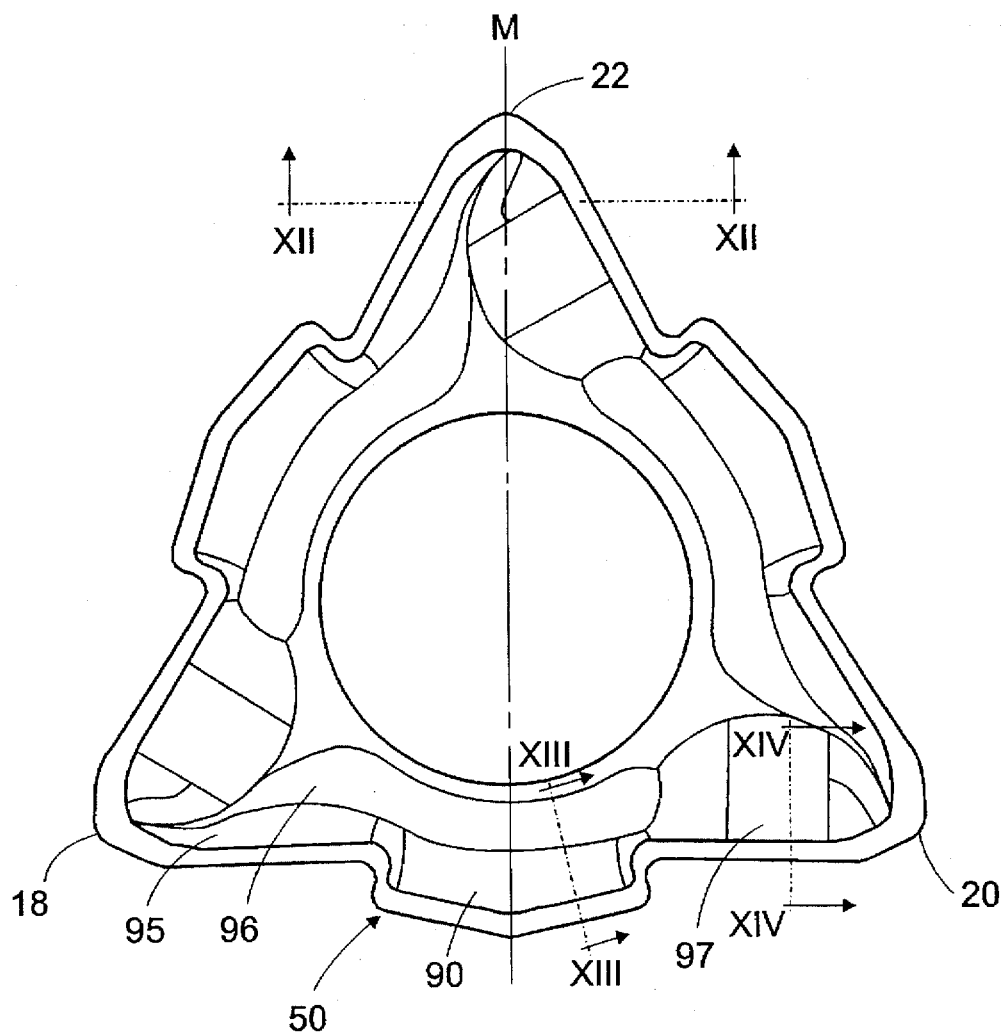
FIG. 11 is a top plan view of the insert illustrating a preferred chip forming means.
Figure 12:
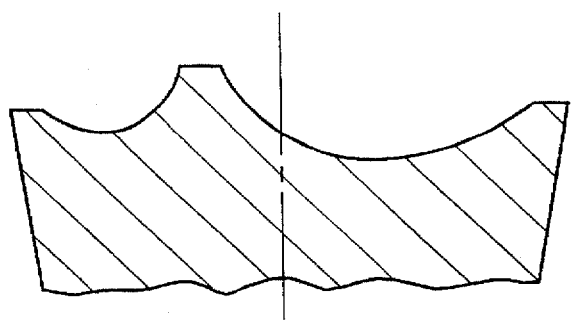
FIGS. 12. 13 and 14 are cross-sectional views of the insert shown in FIG. 11 taken along the line, XII—XII, XIII—XIII and XIV—XIV.
Figure 14:
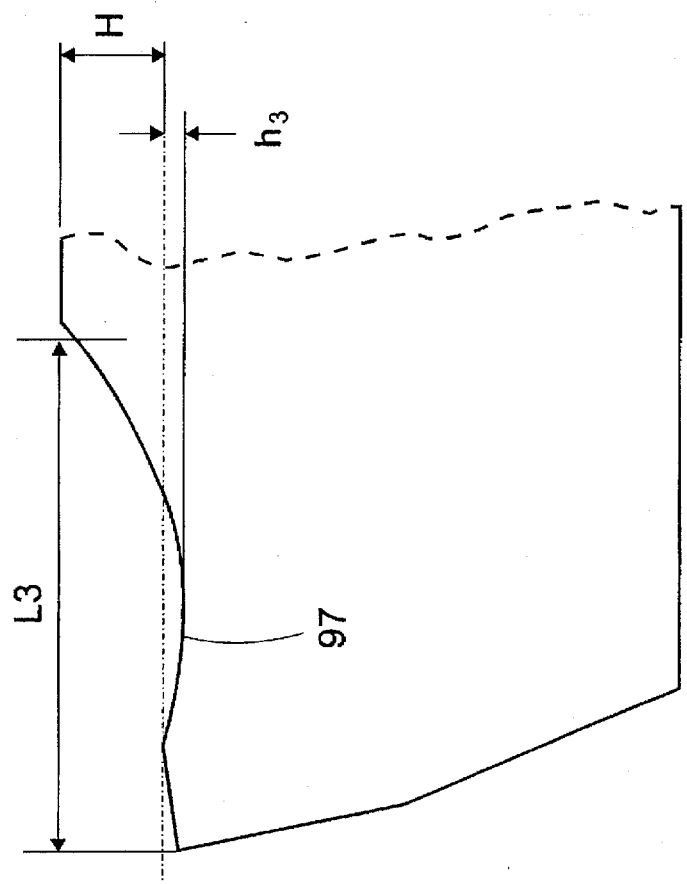
Figure 13:
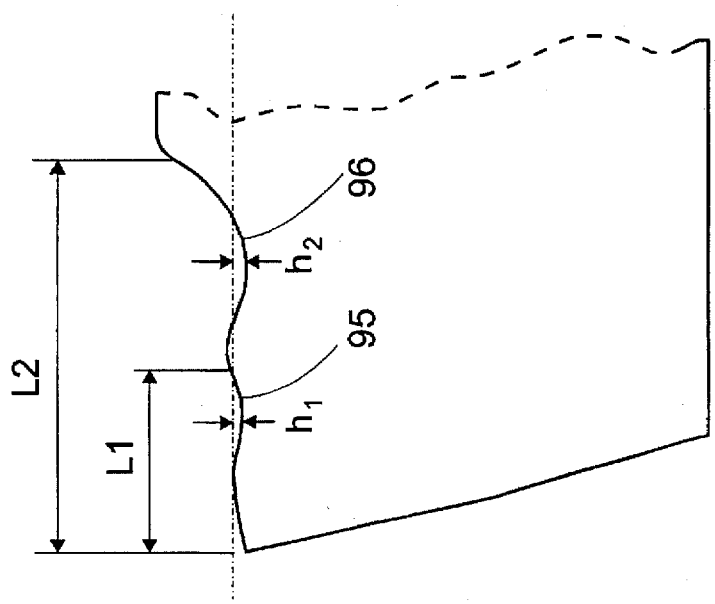

With reference to FIGS. 8–10, a general construction of a chip forming means provided on the insert rake face 32 will be described. This means is formed as a groove 90 extending along the cutting edges of the insert. The chip forming groove 90 comprises an initial land surface 91, 91', 91" situated adjacent to the insert tuning edge and followed by a downward sloping portion 92, 92', 92", which in turn merges with an uprising chip deflection portion 93, 93', 93". The depth of the chip forming groove varies along the length of the cutting edge so that in the vicinity of the main cutting corner which is outermost with respect to the axis Z (see FIG. 6) the groove has its largest depth 94, at the vicinity of the intermediate cutting corner the groove has an intermediate depth 94" and between the intermediate culling corner and the main cutting corner which is innermost with respect to the axis Z the groove has its smallest depth 94'. It is advantageous if the slope of the land surface in each cross-section of the insert is such as to ensure a local rake angle included between the land surface and a line R, R', R" to remain substantially invariant along the entire cutting insert perimeter. The rake angle can be positive or negative Preferably, the chip forming means is provided with additional specific features, illustrated in FIGS. 11, 12, 13 and 14, where the chip forming groove 90 is shown to have different shape in the vicinity of the different component cutting, edges depending on a remoteness of the component cutting edge from the axis of the drill when the insert is positioned therein. Thus, the shape of the chip forming groove 90 is such that in a central part of the cutting edge, i.e. in the vicinity of the intermediate cutting corner 24, and in aside part between the intermediate cutting corner 24 and a radially innermost main cutting corner 18 the chip forming groove consists of two grooves 95 and 96 having different depths h1 and h2 and extending from the cutting edge at distances L1 and L2, while in the vicinity of the radially outermost main cutting corner 20 the chip forming groove consists of one large groove 97 with a depth h3>h1;h2 and a width L3>L2. By virtue of the above-described geometry of the chip forming groove, account is taken of the influence on chip formation of the cutting speed varying along the cutting edge and an efficient chip control and easy evacuation of chips at low and medium feeds is ensured, providing thereby an increased output of the drilling operation.

Figure 15:
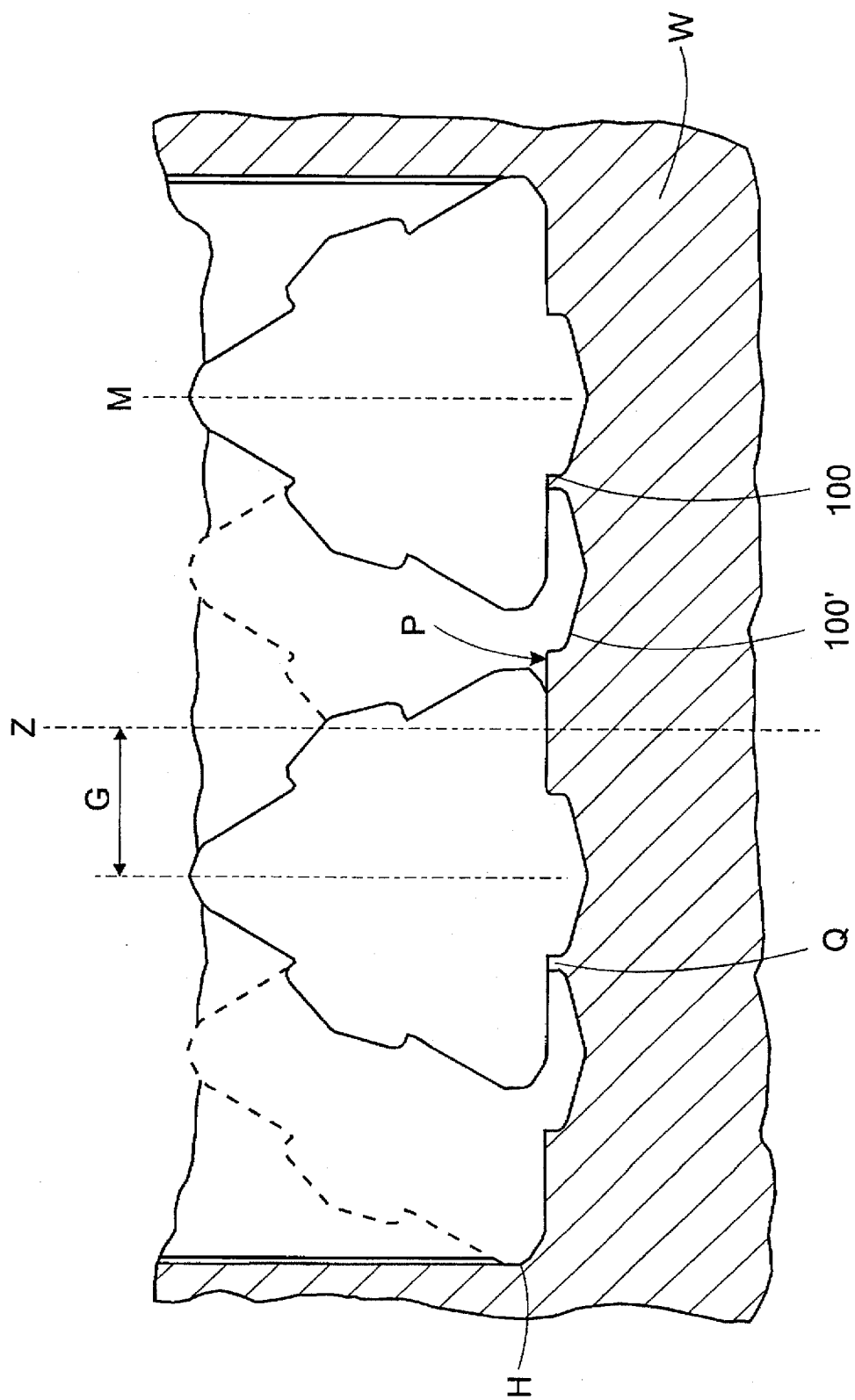
FIG. 15 illustrates the relative disposition of a pair of drilling inserts during drilling with respect to the drilled hole.

In FIG. 15 there is illustrated a relative disposition of the cutting inserts when the drill rotates about its axis Z, where the position of each cutting insert in accordance with FIG. 3 is shown in full lines and a fragment of the position of each insert after turning the drill by 180° is shown in dotted lines. As can be seen, a profile P is thus created on a face of the hole corresponding to respective projections 100 and 100' of the cutting edges 50 and 50' of the inserts, which projections overlap providing a continuous cutting across the radial region included between the drill axis and the end of the cutting edge of the radially outermost insert 7. The profile P includes annular portions Q which max serve as guiding means and improve concentricity and stability of the drill. If desired, the annular portions Q of the profile P may be deliberately reduced or eliminated by slightly slanting one or both of the inserts and by a proper choice of a radial gap G and of an angle of the median line M of the insert with respect to the axis Z.

Figure 16:
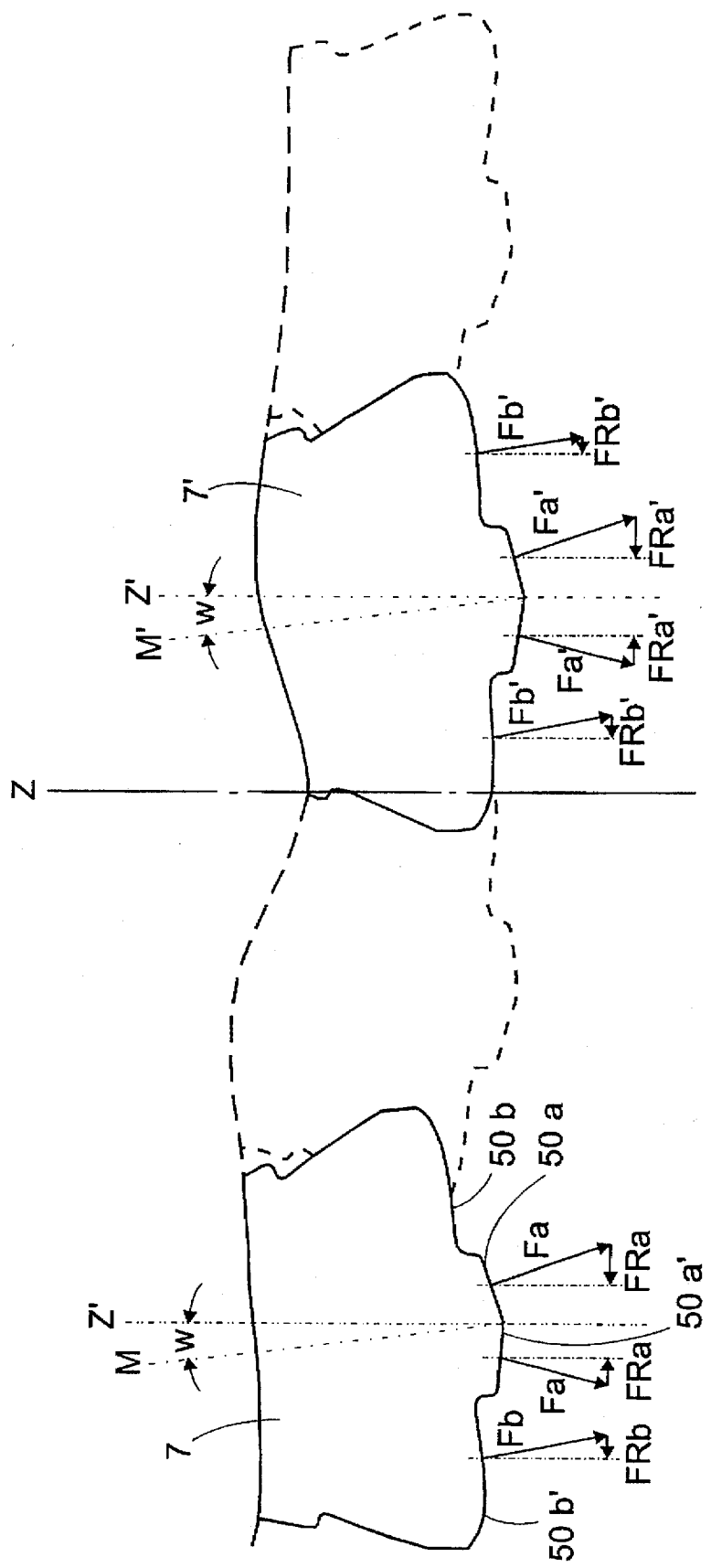
FIG. 16 schematically illustrates the distribution of the radial components of cutting forces acting upon the inserts.

As shown in FIG. 16 the inserts 7 and 7' can be so arranged in the tool that each median line M, M' is slightly slanted in different senses forming angle ω to with the axis Z. Preferably, the angle ω does not exceed 8°. By virtue of the specific orientation of the component cutting edges 50a and 50b described above, and by an appropriate choice of the parameters characterizing this orientation, a proper compensation of radial components of the cutting force acting upon the insert may be achieved and, therefore, the drill stability during drilling is improved providing, at the same time, an effective chip splitting. As the component cutting edges of each cutting edge slope in different senses, radial components FRa, FRa' of the cutting forces Fa, Fa' acting upon the component cutting edges 50a and 50a' and radial components FRb, FRb' of the cutting forces Fb, Fb' acting upon the component cutting edges 50b and 50b' of the inserts are seen to have different values and directions with respect to the axis of rotation Z. Therefore, by virtue of optimization of shapes and positioning geometry of the inserts, an improved force equilibrium state in the radial direction may be achieved in the drill with two or more indexable inserts ensuring an improved stability, particularly when entering or exiting from the workpiece, and reducing vibration during operation.

Figure 17:
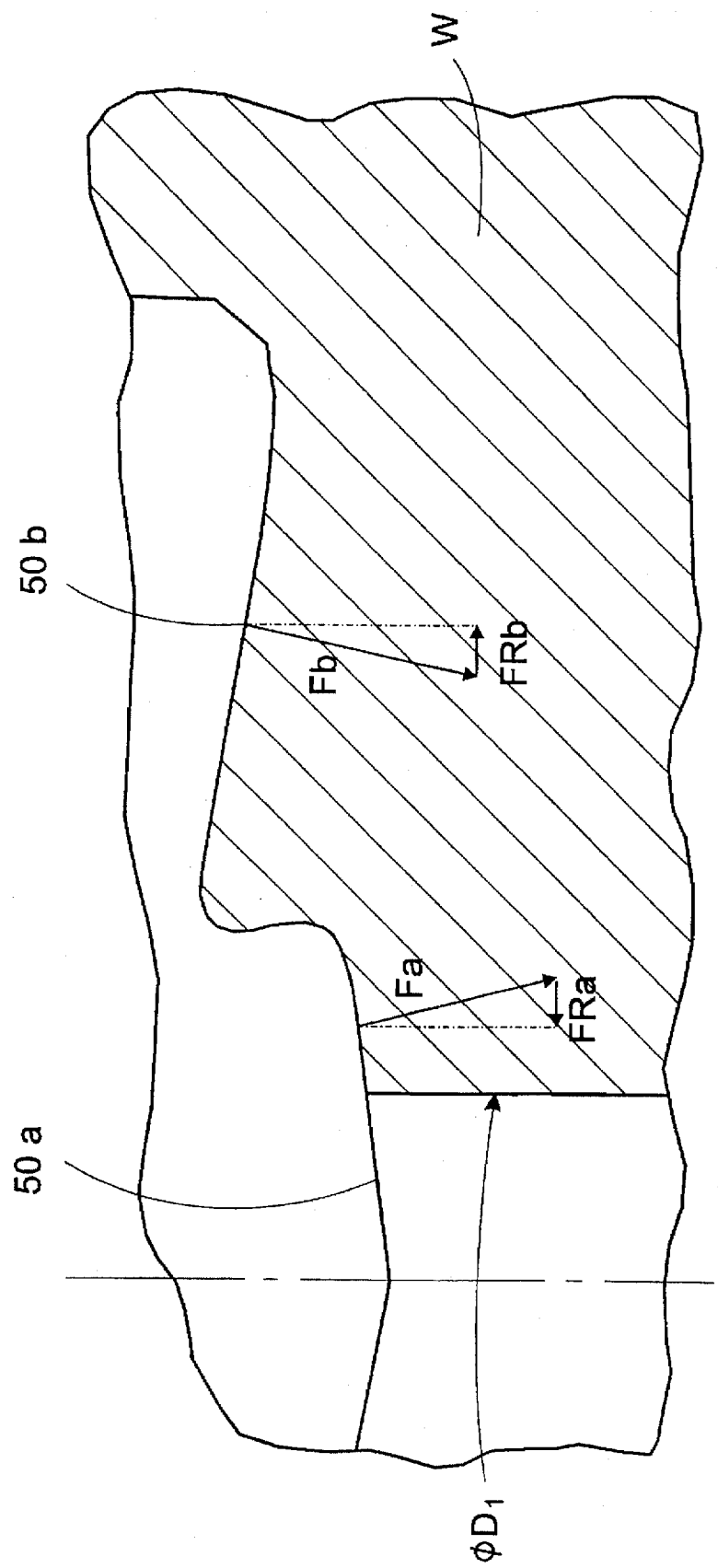
FIG. 17 is another embodiment of the present invention when only one insert is used for enlarging a hole diameter.

Though in the preferred embodiment of the present invention the drill is equipped with two inserts, it should be understood that the use of more than two inserts or of only one insert is also possible. Thus, the use of only one insert in operation for enlarging a diameter D1 of the workpiece W is shown in FIG. 17. The two component cutting edges 50a and 50b slope in different directions so that the radial component FRa of the cutting force Fa acting upon the component cutting edge 50a is directed towards the axis of rotation Z and the radial component FRb of the cutting force Fb acting upon the component cutting edge 50b is directed away from the axis of rotation Z. Therefore, by virtue of the proper choice of mutual orientation of the component cutting edges as well as of the mutual disposition of the cutting edges of the inserts with respect to the axis Z, the drill may be provided with an optimized overall balance of cutting forces, in particular of their radial components.

With a drilling tool according to the present invention, drilling of holes with diameters of 22–34 mm performed in low carbon steel at the appropriate feed of 0.15 mm/rev provided a surface finish of 1 μm Ra after the initial drilling operation. By virtue of wipers provided at the main cutting corners, it was possible to combine drilling with internal turning and to achieve a hole accuracy of IT5 and surface finish of 0.5 μM Ra. In order to achieve similar results by machining with conventional drills an additional tool would be required.

Figure 6A:
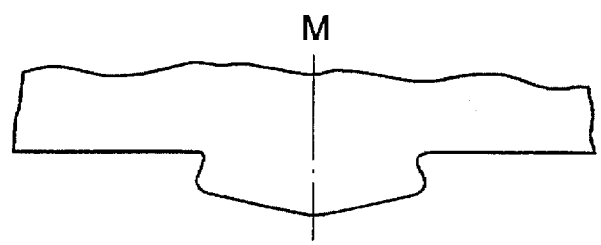
FIGS. 6a–6c illustrate schematically alternative configurations of the cutting edge.
Figure 6B:
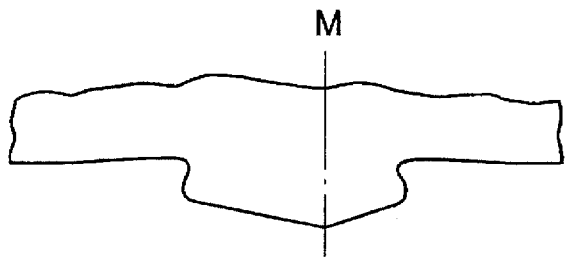
Figure 6C:
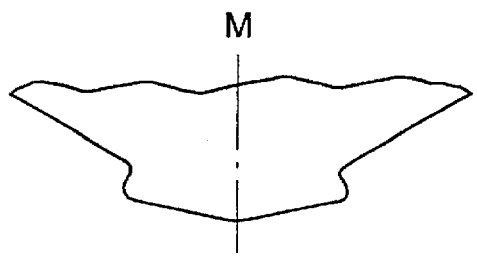

It should be noted that different alternative embodiments of the inserts employed in the drill are possible. The inserts may differ in size or shape, depending upon the drill design and diameter. Each insert may be of square, rhomboid, parallelogram or octagonal rather than hexagonal configuration. The cutting edges of the insert max, have an asymmetric arrangement of the component cutting edges (FIGS. 6b). it should be understood that alternatively the component cutting edges 50a and 50b may be oriented in the same direction as shown for example in FIG. 6c, or only one of the component cutting edges max, be slanted with respect to the median line while the other may be normal to this line (FIG. 6a).

Figure 18:
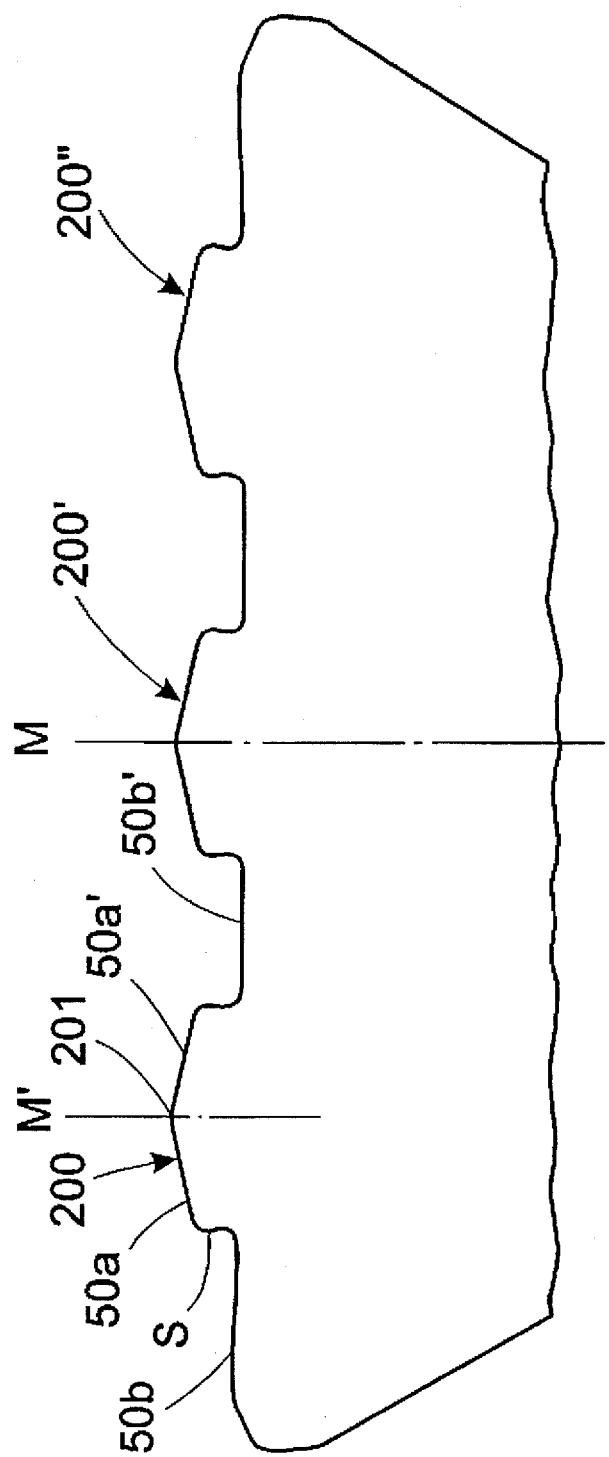
FIG. 18 is an example of a further embodiment of an insert in accordance with the invention having a cutting edge consisting of three sets of pairs of component cutting edges.

If a cutting edge of the drill is long enough e.g. as shown in FIG. 18, it max. consist of two or more sets 200, 200' 200" of component cutting edges, each set representing the cutting edge as shown in FIG. 6, i.e. consisting of two pairs of component cutting edges 50a–50b and 50a'–50b', the component cutting edges 50a and 50a' of both pairs of each set merging in a common point 201 and the component cutting edges 50a and 50b having extremities with respect to the point 201. The extremity of the component cutting edge 50a and an innermost extremity of the component cutting edge 50b merge via a bridging section S which is inclined with respect to a central line M' parallel to a median line M of the insert so that the outermost extremity of the component cutting edge 50b is closer to the line M' than the extremity of the component cutting edge 50a ensuring that during the drilling action a line parallel to a longitudinal axis of the drill and passing through the extremity of the component cutting edge 50a intersects the component cutting edge 50b and the extremities overlap.

I claim:

1. A metal drilling tool having an elongated body with a longitudinal axis and provided with at least one pocket at its working end, at least one indexable cutting insert mounted in the or each pocket for performing drilling action said insert comprising: a rake face, relief flank faces, a base, a plurality of cutting edges, each defined between the rake face and adjacent relief flank face and included between two adjacent cutting corners, each of said cutting edges comprising at least one set of component cutting edges, each set comprising two pairs of component cutting edges, each pair comprising a first and a second component cutting edge, the first component cutting edges of both pairs merging in a common point, said component cutting edges being oriented so that an extremity of the second component cutting edge innermost with respect to said common point is closer to a center of the insert than an extremity of the first component cutting edge which is outermost with respect to said common point, said extremities merging via a bridging section which is directed from said outermost extremity of the first component cutting edge towards a central line constituting or parallel to a median line of the insert passing through said common point so that said innermost extremity of said second component cutting edge is closer to said central line than said outermost extremity of said first component cutting edge ensuring that during the drilling action a line parallel to said longitudinal axis and passing through said outermost extremity of the first component cutting edge intersects said second component cutting edge and said extremities overlap.

2. A drilling tool according to claim 1, wherein at least said first component cutting edge is oblique with respect to said central line of the insert.

3. A drilling tool according to claim 2, wherein said first and second component cutting edges are oblique with respect to said central line of the insert.

4. A drilling tool according to claim 3, wherein said first and second component cutting edges are slanted with respect to said central line of the insert at acute angles.

5. A drilling tool according to claim 2, wherein said first component cutting edge is slanted with respect to said central line at an acute angle and said second component cutting edge is slanted with respect to said central line at an angle which is not less than 90°.

6. A drilling tool according to claim 1, wherein said pairs of component cutting edges are arranged symmetrically with respect to said central line of the insert.

7. A drilling tool according to claim 1, wherein said pairs of component cutting edges are arranged asymmetrically with respect to said central line of the insert.

8. A drilling tool according to claim 1, wherein said relief flank face included between two adjacent cutting corners comprises a clearance component and a support component, both sloping to the base at different angles.

9. A drilling tool according to claim 1, wherein the rake face of the insert is provided with a chip forming means in the form of a groove of variable dimensions.

10. A drilling tool according to claim 9, wherein the depth and the width of the groove formed along a component cutting edge which is radially outermost with respect to said longitudinal axis of the drill are larger than the depth and the width of the groove formed along the remainder of the cutting edge.

11. A drilling tool according to claim 10, wherein a portion of said groove formed substantially along the first component cutting edges and a second component cutting edge which is radially innermost with respect to said longitudinal axis comprises two grooves.

12. A drilling tool according to claim 1, wherein each cutting corner is provided at both sides with a chamfer, said second component cutting edge merging with said chamfer.

13. A drilling tool according to claim 1, wherein said at least one cutting edge is provided with an intermediate cutting corner located between said adjacent cutting corners of said insert and protruding beyond said adjacent cutting corners, as seen in an insert plan view, the first component cutting edges of the both pairs of component cutting edges forming sides of said intermediate corner.

14. A drilling tool according to claim 1, wherein the body of the drilling idol is provided with at least one additional pocket at its working end for mounting thereto at least one additional cutting insert for performing said drilling action.

15. A drilling tool according to claim 14, wherein said cutting insert and said at least one additional cutting insert are of substantially the same design.

16. A drilling tool according to claim 14 or 15, wherein at least one of said inserts is mounted in said pocket in such a manner that the median line thereof is inclined with respect to said longitudinal axis.

17. An indexable cutting insert for use in a drilling tool, comprising: a rake face, relief flank faces, a base, a plurality of cutting edges, each defined between the rake face and adjacent relief flank face and included between two adjacent cutting corners, each of said cutting edges comprising at least one set of component cutting edges, each set comprising two pairs of component cutting edges, each pair comprising a first and a second component cutting edge, the first component cutting edges of both pairs merging in a common point, said component cutting edges being oriented so that an extremity of the second component cutting edge innermost with respect to said common point is closer to a center of the insert than an extremity of the first component cutting edge outermost with respect to said common point, said extremities merging via a bridging section which is directed from said outermost extremity of the first component cutting edge towards a central line constituting or parallel to a median line of the insert and passing through said common point so that said innermost extremity of said second component cutting edge is closer to said central line than said outermost extremity of said first component cutting edge ensuring overlapping of said extremities during a drilling action.

18. An insert according to claim 17, wherein at least said first component cutting edge is oblique with respect to said central line of the insert.

19. An insert according to claim 18, wherein both of said first and second component cutting edges are oblique with respect to said central line of the insert.

20. An insert according to claim 19, wherein said first and second component cutting edges are slanted with respect to said central line at acute angles.

21. An insert according to claim 19, wherein said first component cutting edge is slanted with respect to said central line at an acute angle and said second component cutting edge is slanted with respect to said central line at an angle which is not less than 90°.

22. An insert according to claim 17, wherein said pairs of component cutting edges are arranged symmetrically with respect to said central line of the insert.

23. An insert according to claim 17, wherein said pairs of component cutting edges are arranged asymmetrically with respect to said central line of the insert.

24. An insert according to claim 17, wherein said relief flank face included between two adjacent cutting corners comprises an upper clearance component and a lower support component.

25. An insert according to claim 24, wherein said support component is slanted with respect to said base at an angle different from a sloping angle of said clearance component.

26. An insert according to claim 17, wherein the rake face of the insert is provided with a chip forming means in the form of a groove extending along the cutting edge and having variable dimensions.

27. An insert according to claim 26, wherein the depth and the width of the groove formed along a component cutting edge which is radially outermost with respect to a longitudinal axis of the drilling tool when the insert is mounted therein, are larger than the depth and the width of the groove formed along the remainder of the cutting edge.

28. An insert according to claim 27, wherein a portion of said groove formed substantially along the first component cutting edges and a second component cutting edge which is radially innermost with respect to said longitudinal axis, comprises two grooves.

29. An insert according to claim 17, wherein each cutting corner is provided at both sides with a chamfer, said second component cutting edge merging with said chamfer.

30. An insert according to claim 17, wherein said insert is provided with an intermediate cutting corner located between said adjacent cutting corners and protruding beyond said adjacent cutting corners, as seen in an insert plan view, the first component cutting edges of both pairs of component cutting edges forming sides of said intermediate cutting corner.

31. An insert according to claim 17, wherein said at least one cutting edge is formed with one set of pairs of component cutting edges and wherein said central line is constituted by said median line.

32. An insert according to claim 17, wherein said at least one cutting edge is formed with more than one set of pairs of component cutting edges and wherein said central line is constituted by a line parallel to said median line and passing through said common point.

33. An insert according to claim 17, wherein the extent of overlapping of said extremities of the component cutting edges in each pair is such that, when the insert is mounted in the tool, a line parallel to a longitudinal axis of the tool and passing through said outermost extremity of the first component cutting edge intersects said second component cutting edge.

34. A cutting insert for use in a drilling tool comprising: a rake face, relief flank faces, a base, a plurality of cutting edges, each defined between the rake face and adjacent relief flank face and included between two adjacent cutting corners;

at least one of said cutting edges comprising at least one set of component cutting edges, each set comprising two pairs of component cutting edges which pairs are arranged at two sides of a central line passing through a common point of merger of the two pairs and constituting or parallel to a median line of the insert;

each pair comprising a first and a second component cutting edge merging through a bridging section directed substantially towards said central line of the insert, said component cutting edges being oriented with respect to said central line so that a radially innermost extremity of the second component cutting edge is closer to the center of the insert and to said central line than a radially outermost extremity of said first component cutting edge.

35. An insert according to claim 34, wherein said first component cutting edges form therebetween an intermediate cutting corner having an apex at said common point and protruding beyond adjacent cutting corners, as seen in an insert plan view.

36. An insert according to claim 34, wherein in each pair of the component cutting edges, said first component cutting edge is slanted with respect to said central line at an acute angle.

37. An insert according to claim 36, wherein both said first and second component cutting edges are slanted with respect to said central line at acute angles.

38. An insert according to claim 36, wherein said second component cutting edge is slanted with respect to said central line at an angle which is not less than 90°.

39. An insert according to claim 34, wherein said pairs of component cutting edges are arranged symmetrically with respect to said central line of the insert.

40. An insert according to claim 34, wherein said pairs of component cutting edges are arranged asymmetrically with respect to said central line of the insert.

41. An insert according to claim 36, wherein the rake face of the insert is provided with a chip forming means in the form of a groove extending along the cutting edge and having variable dimensions.

42. An insert according to claim 41, wherein the depth and the width of the groove formed substantially along a component cutting edge which is radially outermost with respect to a longitudinal axis of the drilling tool, when the insert is mounted therein, are larger than the depth and the width of the groove formed along the remainder of the cutting edge.

43. An insert according to claim 42, wherein a portion of said groove formed along the first component cutting edges and a second component cutting edge which is radially innermost with respect to said longitudinal axis, comprises two grooves.

44. An insert according to claim 34, wherein both sides of each cutting corner is provided with a chamfer, said second component cutting edge merging with said chamfer.

45. An insert according to claim 34, wherein the extent of overlapping of said extremities of the component edges in each pair thereof is such that, when the insert is mounted in the tool, a line parallel to a longitudinal axis of the tool and passing through said outermost extremity of the first component cutting edge intersects said second component cutting edge.

* * * * *